United States Patent [19]
Brück et al.

[11] Patent Number: 5,483,614
[45] Date of Patent: Jan. 9, 1996

[54] OPTICAL WAVEGUIDE MOLDINGS MADE FROM SILICON NITRIDE AND A METHOD OF DETECTING OPTICAL WAVELENGTHS USING SAME

[75] Inventors: Martin Brück, Hofheim am Taunus; Tilo Vaahs, Kelkheim/Taunus; Marcellus Peuckert, Hofheim am Taunus; Ude Scheunemann, Liederbach; Thomas Stehlin, Hofheim am Taunus; Jürgen Theis, Oberursel, all of Germany

[73] Assignee: Hoechst Aktiengesellschaft, Frankfurt, Germany

[21] Appl. No.: 278,391

[22] Filed: Jul. 21, 1994

Related U.S. Application Data

[62] Division of Ser. No. 127,987, Sep. 27, 1993, Pat. No. 5,358,746, which is a continuation of Ser. No. 690,656, Apr. 24, 1991, abandoned.

[30] Foreign Application Priority Data

Apr. 26, 1990 [DE] Germany .................. 40 13 306.0

[51] Int. Cl.⁶ .................. G02B 6/02; B05D 3/02; B29D 11/00
[52] U.S. Cl. .................. 385/142; 385/127; 385/128; 385/141; 385/144; 427/376.2; 264/1.24; 264/1.7; 501/97; 428/698
[58] Field of Search .................. 385/129, 130, 385/131, 132, 141, 142, 144, 127, 128; 427/376.2, 379, 387; 501/96, 97, 98, 99; 264/1.7, 2.7, 62, 65, 1.24; 428/698

[56] References Cited

U.S. PATENT DOCUMENTS

| | | | |
|---|---|---|---|
| 3,941,630 | 3/1976 | Larrabee | 156/13 |
| 4,457,958 | 7/1984 | Lange et al. | 427/314 |
| 4,482,669 | 11/1984 | Seyferth et al. | 524/442 |
| 4,500,694 | 2/1985 | Ohmori et al. | 526/245 |
| 4,535,007 | 8/1985 | Cannady | 427/226 |
| 4,540,803 | 9/1985 | Cannady | 556/412 |
| 4,543,344 | 9/1985 | Cannady | 501/92 |
| 4,581,622 | 4/1986 | Takasaki et al. | 357/23.5 |
| 4,615,584 | 10/1986 | Ohmori et al. | 385/141 X |
| 4,618,541 | 10/1986 | Foroumi et al. | 428/688 |
| 4,656,347 | 4/1987 | Une et al. | 250/201 |
| 4,665,426 | 5/1987 | Allen et al. | 357/54 |
| 4,695,122 | 9/1987 | Ishida et al. | 385/130 X |
| 4,720,532 | 1/1988 | Seyferth et al. | 528/28 |
| 4,725,660 | 2/1988 | Serita et al. | 528/28 |
| 4,737,015 | 4/1988 | Ishida et al. | 385/130 X |
| 4,746,480 | 5/1988 | Clark | 264/62 |
| 4,916,093 | 4/1990 | Okamura et al. | 501/95 |
| 4,935,481 | 6/1990 | Vaahs et al. | 528/28 |
| 5,008,320 | 4/1991 | Haluska et al. | 524/361 |
| 5,008,423 | 4/1991 | Gerdau et al. | 556/412 |
| 5,119,411 | 6/1992 | Nakamura | 378/206 |
| 5,134,681 | 7/1992 | Ratovelomanana et al. | 385/130 |
| 5,246,738 | 9/1993 | Blum | 427/387 |
| 5,262,201 | 11/1993 | Chandra et al. | 427/376.2 |
| 5,358,746 | 10/1994 | Bruck et al. | 427/376.2 |

OTHER PUBLICATIONS

World Patents Index Database; Woche 14.1979, NR 79-27150B, Derwent, JP-A-54 027 446, published Mar. 1, 1979 (Abstract).
European Search Report EP 91 10 6662.
Ceramic Bulletin, vol. 62 (1983), 904-915 No Month).

*Primary Examiner*—Brian Healy
*Attorney, Agent, or Firm*—Curtis, Morris & Safford

[57] ABSTRACT

A transparent molded article for optical applications made from silicon nitride and a coating thereon of oxidic silicon nitride formed by chemical reaction of the silicon nitride with oxygen. The moldings can be shaped, depending on the area of application, to give various articles, for example optical waveguides, prisms, sensor elements or lenses, and are used in all areas where high optical demands are made.

8 Claims, 1 Drawing Sheet

OPTICAL WAVEGUIDE MOLDINGS MADE FROM SILICON NITRIDE AND A METHOD OF DETECTING OPTICAL WAVELENGTHS USING SAME

This application is a division of application Ser. No. 08/127,987, now U.S. Pat. No. 5,558,746, filed Sep. 27, 1993 which is a continuation of application Ser. No. 07/690,656 filed Apr. 24, 1991, now abandoned.

BACKGROUND OF THE INVENTION

The invention relates to optical materials made from silicon nitride, to a process for their preparation by pyrolysis of polymeric silazanes, and to their use.

The silicon nitride-containing ceramic optical material is obtained by pyrolysis of polysilazanes, which are previously processed to give the desired moldings. A surface oxidic coating can be produced by the pyrolysis process.

The pyrolysis of polysilazanes to give silicon nitride/silicon carbide-containing ceramic material has already been described in the literature (Ceramic Bulletin, Vol. 62 (1983), 904–915). Polysilazanes are generally prepared using chlorosilanes as starting material, which are reacted with ammonia, primary or secondary amines or with disilazane (U.S. Pat. Nos. 4,540,803, 4,543,344, 4,535,007 and 4,482,669).

A further method of preparing polysilazanes is to react aminosilanes with excess ammonia or excess primary amine. The aminosilanes are themselves prepared by reacting chlorosilanes with amines (FR-A 1 25 83 423). For example, tetrachlorosilane $SiCl_4$ and methylamine give the tetrakis(methylamino)silane $Si(NHCH_3)_4$:

$$SiCl_4 + 8\ CH_3NH_2 = Si(NHCH_3)_4 + 4\ CH_3NH_3Cl$$

The aminosilane is subsequently reacted with excess ammonia, with all the methylamino groups being replaced by NH groups. Viscous to highly viscous polysilazanes are produced, which can be pyrolyzed to give silicon nitride-containing material in a ceramic yield of from 72 to 79% by weight. The disadvantage of this process is the use of large amounts of alkylamine, half of which reprecipitates as alkylamine hydrochloride in the preparation of the aminosilane. The polymers prepared from the aminosilane are viscous and therefore difficult to process; fiber production is not possible.

A large number of optical materials are known from the prior art. The materials used hitherto (for example glass, polysiloxanes, polymethyl methacrylates (PMMAs), etc.) all have the disadvantage that their possible uses are limited by the upper temperature limits. Thus, polymethyl methacrylates can only be employed up to a maximum of 80° to 90° C. and glass up to a maximum of 800° C.

In addition, in fiber optics, a coating completely surrounding the fibers must be applied. The application of coatings of this type, for example by immersing the fibers in a solution containing a polymer in dissolved form or by special spinning processes, is expensive and complicated.

SUMMARY OF THE INVENTION

The object was therefore to find a simple process for the production of optical moldings which are distinguished by good temperature and chemical resistance and by good mechanical properties.

The present invention achieves this object.

The present invention provides a process for the preparation of optical materials from silicon nitride by pyrolysis of polymeric silazanes, by pressing the pulverulent polymeric silazanes to give moldings before the pyrolysis or first dissolving the polymeric silazanes in an organic solvent, drawing fibers from this solution and pyrolyzing these fibers after evaporation of the solvent, or by preparing melts of polymeric silazanes, converting these melts into moldings by casting, injection molding or extrusion and subsequently pyrolyzing the moldings, which comprises producing an oxidic coating on the silicon nitride moldings in an oxygen-containing atmosphere during or after the pyrolysis. The pyrolysis is preferably carried out in an atmosphere containing ammonia or an ammonia/inert gas mixture at temperatures of from 800° to 1400° C.

The silicon nitride optical molding produced by this process and having a surface coating of oxidic ceramic contains up to a maximum of 1% of carbon, up to a maximum of 2% of hydrogen and up to a maximum of 10% of oxygen, is highly transparent and amorphous if the temperature during pyrolysis does not exceed the crystallization point. By contrast, the amorphous silicon nitride contains some silicon nitride as a crystalline phase if the temperature during pyrolysis exceeds the crystallization point. The optical moldings produced according to the invention can be employed at temperatures above 800° C. and are particularly suitable for use as optical sensors or optical waveguides.

The optical moldings according to the invention are produced from polysilazanes, which are converted into silicon nitride by pyrolysis.

Suitable polymeric silazanes are all silazanes which have ceramic yields significantly above 30% by weight on pyrolysis in an ammonia-containing atmosphere. Polymeric silazanes of this type are described, inter alia, in U.S. Pat. No. 4,720,532, U.S. Pat. No. 4,482,669, DE-A-3 733 727 and DE-A-3 737 921.

A process of this type which yields solid polysilazanes which are soluble in common solvents and/or are fusible and can therefore be spun from a solution and/or melt is described in DE-A-B 3 737 921.

Examples of starting materials employed in this process for the polymeric silazanes are dialkylaminodichlorosilanes, which can be obtained from organyl trichlorosilane and dialkylamines; the starting materials are reacted with at least 3.5 mol of ammonia in aprotic solvents at temperatures between −80° C. and +70° C.

In this reaction, an ammonia molecule first reacts with two SiCl functions to give an NH bridge between the two silicon atoms:

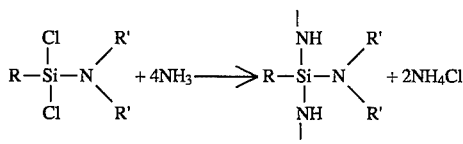

Oligomeric units are formed by this reaction. Subsequently, some of the dialkylamino groups are displaced from the silicon atom, forming crosslinked polymeric silazanes. At the same time, the terminal dialkylamino groups are replaced by NH bridges, producing additional crosslinking.

The polymeric silazanes formed dissolve in all common aprotic solvents and contain the following structural units:

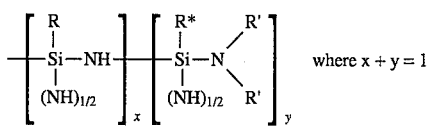

where the same radicals are possible for R* as for R, but R and R* may be identical or different (different if more than one aminochlorosilane is reacted with $NH_3$), R=$C_1$–$C_4$-alkyl, vinyl or phenyl, R'=$C_1$–$C_4$-alkyl, and x and y are the molar fractions of the two structural units, where x+y=1 and x=0.7–0.95.

This controllable ratio between x and y determines the degree of crosslinking of the polymeric silazane and thus the viscosity and processability to the ceramic.

Pyrolysis of silazanes of this type gives amorphous, glass-clear silicon nitride containing traces of carbon, hydrogen and oxygen. The carbon content is a maximum of 1% by weight, while hydrogen may be present up to 2% by weight and oxygen up to as much as 10% by weight.

The pyrolysis is carried out in an atmosphere containing ammonia or an ammonia/inert gas mixture. Examples of suitable inert gases are the noble gases argon and helium, but also nitrogen, with $NH_3$/noble gas mixtures being preferred. The pyrolysis temperatures are in the range from 800° to 1400° C. Temperatures above 1200° C., in particular from 1200° to 1400° C., cause the formation of partially amorphous microcrystalline ceramic materials containing α-silicon nitride as a crystalline phase. Below 1200° C., highly transparent, colorless, purely amorphous silicon nitride moldings are obtained.

Depending on the pyrolysis temperature, the pyrolysis product in this process comprises virtually purely amorphous (below 1200° C.) or partially crystalline (above 1200° C.) silicon nitride.

An advantage of the polysilazanes employed is their ability to be shaped to give three-dimensional moldings even before pyrolysis. The shaping can be carried out here, for example, by extrusion, slip casting, melt spinning or pressing of pulverulent polysilazanes or by other known processes.

The polysilazane moldings obtained in this way are subjected to pyrolysis, the moldings being exposed to an oxygen-containing atmosphere during or after the pyrolysis, an oxidic coating thus being produced thereon. In this way, core/cladding moldings can be produced, which are particularly Suitable for optical applications.

The oxygen treatment can be carried out at the same temperatures as the pyrolysis, preferably above 1200° C., but in particular at temperatures in the range from 1300° C. to 1400° C. The thickness of the oxidic coating can be adjusted in a simple manner through the duration of the oxygen treatment. In this way, it is thus possible, by a time-saving process which is simple to carry out, to produce optical articles which have excellent adhesion of the cladding to the core and a defined cladding diameter without the cladding being applied to the moldings in a separate process step.

The optical material prepared according to the invention can, after suitable shaping, be employed, in particular, as optical waveguides.

The requirement for the cladding to have a lower refractive index than the core of an optical waveguide is satisfied by the moldings produced according to the invention since the refractive index of the outer oxygen-containing ceramic coating is in the range from 1.44 to 1.55, while that of the silicon nitride phase is from 1.65 to 2.00 (at λ=546 nm), depending on the oxygen content of the silicon nitride ceramic.

A further advantage of these moldings obtained in this way is their good temperature and chemical resistance and their good mechanical properties. Thus, the moldings produced in this way can be employed without hesitation at temperatures above 800° C., even resist temperatures up to 1700° C. for some time and can even be used at above 1800° C. under an elevated nitrogen pressure.

BRIEF DESCRIPTION OF THE DRAWING

The following detailed description, given by way of example but not intended to limit the invention solely to the specific embodiments described, may best be understood in conjunction with the accompanying drawing, in which.

DETAILED DESCRIPTION OF THE INVENTION

Figure 1:
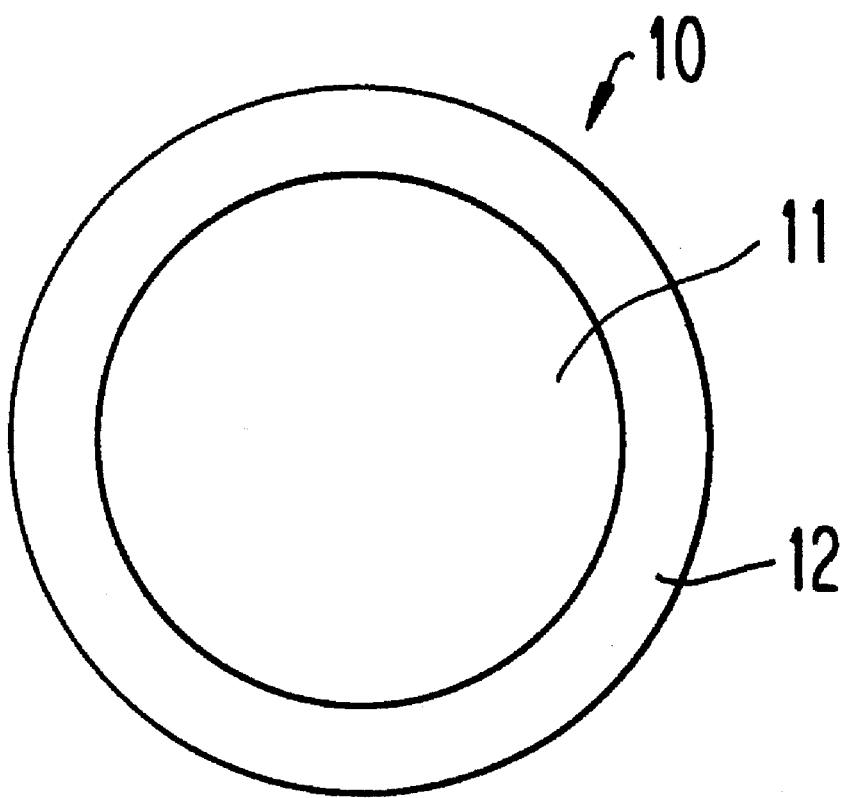
FIG. 1 schematically shows a cross section of an optical molding in accordance with the present invention.

Referring now to FIG. 1, the moldings 10 according to the invention made from silicon nitride 11 having an oxidic coating 12 can be shaped, depending on the area of application, to give various articles (for example optical waveguides, prisms, sensor elements or lenses) and are used in all areas where high optical demands are made.

EXAMPLES

Example 1

A polymeric hydridochlorosilazane prepared in accordance with DE-A-3 733 727 was spun through a 300 μm nozzle to give filaments. These filaments were pyrolyzed in an ammonia atmosphere containing 2 vpm of $O_2$ up to a final temperature of 1300° C. The silicon nitride filaments obtained had a diameter of 100 μm and an element composition which contained 3.4% by weight of oxygen, 0.8% by weight of hydrogen and 0.1% by weight of carbon in addition to silicon and nitrogen.

The cross-sectional surfaces of the fibers were studied by energy-dispersed X-ray analysis (measurement of local concentrations of elements). This revealed that the oxygen concentration at the surface of the fibers, i.e. at the periphery of the cross-section surface, was higher than in the interior of the fibers.

The refractive indices were determined using a two-beam interference microscope:

Refractive index of peripheral region $n_p$=1.443

Refractive index of internal region $n_i$=1.652

This gives, for the numerical aperture NA=$\sqrt{n_i^2 - n_p^2}$,

NA=0.804.

Measurement of the optical attenuation gave 2 dB/cm.

Example 2

A 5% strength by weight solution in toluene (pre-purified, ketyl dried) was prepared from a polymeric hydridochlorosilazane prepared in accordance with DE-A-3 733 727. This solution was subsequently used to apply ultrathin coatings on silicon wafers by spin coating under an inert gas atmosphere and clean room conditions. The silicon had previously been subjected to ceramic etching in order to produce an SiO₂ coating on the silicon wafer. The toluene was then allowed to evaporate slowly, and the wafer was lastly pyrolyzed in an ammonia atmosphere (purity 99.999%) up to 1300° C.

The thickness of the silicon nitride coatings achieved was in the range from 0.1 to 4 μm. The coating thicknesses indicated were determined using an α-stepper. Scanning electron microphotographs showed pore- and crack-free silicon nitride coatings.

Example 3

A silicon nitride fiber having a diameter of 100 μm and a length of 6 cm, produced by the process described in DE-A-3 733 727, was bonded to a glass fiber of the same diameter. To this end, the end faces of the fibers were aligned with one another by pushing the fibers into a glass capillary 2 cm in length. It was possible to fix the fibers by brief local heating of the glass tube. Mechanical stabilization was provided by a small Al₂O₃ tube, into which the bonded fibers were pushed in such a manner that the free end of the silicon fiber jutted out by about 4 cm. The other end of the tube was subsequently sealed using a high-temperature adhesive in order to fix the fiber. The glass fiber, with a length of about 6 meters, was connected to a single-channel simultaneous spectrometer or optionally to a photodiode detector.

This system was used to determine the spectral distribution and the intensity variations of the emitted light in a glass-firing furnace. To this end, the sensor was passed through a drilled hole into the firing chamber and was positioned in the immediate vicinity of the flame front. The sensor could be used as often as desired without any change taking place in the use properties.

We claim:

1. A transparent molded article for optical applications comprising silicon nitride and a coating thereon of oxidic silicon nitride formed by chemical reaction of the silicon nitride with oxygen, wherein at $\lambda=546$ nm the silicon nitride has a refractive index from about 1.65 to about 2.00 and the coating thereon of oxidic silicon nitride has a refractive index from about 1.44 to about 1.55.

2. An article as claimed in claim 1 wherein the silicon nitride is amorphous.

3. An article as in claim 1 wherein the silicon nitride contains, as trace impurities, up to 1 percent by weight carbon, up to 2 percent by weight hydrogen and up to 10 percent by weight oxygen.

4. An article as in claim 3 wherein the silicon nitride is amorphous.

5. An article as in claim 1 wherein the silicon nitride includes a crystalline phase.

6. An article as in claim 1 which can withstand a temperature above 800° C.

7. An optical waveguide comprising silicon nitride and a coating thereon of oxidic silicon nitride formed by chemical reaction of the silicon nitride with oxygen; wherein at $\lambda=546$ nm the silicon nitride has a refractive index from about 1.65 to about 2.00 and the coating thereon of oxidic ceramic has a refractive index from about 1.44 to about 1.55.

8. A method for detecting a wavelength of light comprising passing said light through an optical material connected to a spectrometer or a photodiode detector, wherein said material comprises silicon nitride and a coating thereon of oxidic silicon nitride formed by chemically reacting the silicon nitride with oxygen, wherein at $\lambda=546$ nm the silicon nitride has a refractive index from about 1.65 to about 2.00 and the coating thereon of oxidic silicon nitride has a refractive index from about 1.44 to about 1.55, and detecting the wavelength of light by the spectrometer or the photodiode detector.

* * * * *